United States Patent
Abrams et al.

(10) Patent No.: US 8,447,949 B2
(45) Date of Patent: May 21, 2013

(54) DETECTION OF ZERO ADDRESS EVENTS IN ADDRESS FORMATION

(75) Inventors: Robert M. Abrams, Poughkeepsie, NY (US); Mark S. Farrell, Poughkeepsie, NY (US); Dan F. Greiner, San Jose, CA (US); Christian Jacobi, Poughkeepsie, NY (US); James H. Mulder, Poughkeepsie, NY (US); Peter J. Relson, Poughkeepsie, NY (US); Timothy J. Slegel, Poughkeepsie, NY (US); Peter K. Szwed, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/487,032

(22) Filed: Jun. 18, 2009

(65) Prior Publication Data

US 2010/0325385 A1 Dec. 23, 2010

(51) Int. Cl.
*G06F 9/34* (2006.01)
(52) U.S. Cl.
USPC .............................. 711/200; 711/220; 714/53

(58) Field of Classification Search
None
See application file for complete search history.

(56) References Cited

U.S. PATENT DOCUMENTS

2004/0268319 A1* 12/2004 Tousignant .................. 717/131
2007/0277014 A1* 11/2007 Greiner ........................ 711/165

OTHER PUBLICATIONS

Z/Architecture—Principles of Operation, IBM Publication No. SA22-7832-07, 8th Edition, Feb. 2009.

* cited by examiner

*Primary Examiner* — Yaima Campos
*Assistant Examiner* — Daniel Tsui
(74) *Attorney, Agent, or Firm* — John E. Campbell; Blanche E. Schiller, Esq.; Heslin Rothenberg Farley & Mesiti P.C.

(57) ABSTRACT

One or more registers used to form an address usable in accessing storage are examined to determine if a zero address event has occurred in forming the address. In response to an indication that a zero address event has occurred in address formation, an alert is provided to the program using the address to access storage.

20 Claims, 5 Drawing Sheets

DETECTION OF ZERO ADDRESS EVENTS IN ADDRESS FORMATION

BACKGROUND

This invention relates, in general, to processing within a computing environment, and in particular, to facilitating detection of situations of concern relating to processing within the computing environment.

A commonly encountered error, in computer programs executing within a computing environment, is the use of a memory address formed from a zero-valued register. This is usually considered an error because memory allocated for program use is generally not located at or near location zero. Also, programs generally intend to initialize registers prior to using them in the formation of a memory address, and it is common for the contents of a non-initialized register to be zero.

The detection of this error is difficult, however, and relies upon the detection of some other related error. Memory close to location zero tends to be write-protected to a program, so the mechanism of memory protection will generally alert a program immediately when a store operation is attempted using a zero-valued register. However, in some systems, it is likely that a load operation is legal to a storage address formed with a zero-valued address; the error is only detected if some other check is performed by the program on the validity of the values read from storage.

BRIEF SUMMARY

The shortcomings of the prior art are overcome and additional advantages are provided through the provision of a computer program product for facilitating processing of a computing environment. The computer program product comprises a storage medium readable by a processing circuit and storing instructions for execution by the processing circuit for performing a method. The method includes, for instance, deciding, by a processor, which one or more registers of at least one register used to form a memory address is to be examined; examining, by the processor, contents of the one or more registers to be examined; determining, in response to the examining, whether there is a zero address event in the formation of the memory address; and alerting a program executed by the processor of the zero address event, in response to the determining indicating the zero address event.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for detecting use of a zero-valued register in the formation of an address usable for memory access. In particular, a capability is provided for detecting a zero address (ZAD) event that is to be reported to a program. As used herein, a zero-valued register is a register that has contents of zero. Although not all uses of zero-valued registers in forming addresses usable for memory access are a problem, there are instances when their use should be avoided or at least reported. In these instances, as well as others, a zero address event is reported.

In accordance with one or more aspects of the present invention, a zero address event occurs, for instance, in response to one or more of the following conditions being met:

1) If the instruction execution specifies one register to be used in the formation of the address and the contents of that register are zero;
2) If the instruction execution specifies multiple registers to be used in the formation of the address and the contents of a primary register, described below, are zero;
3) If the instruction execution specifies multiple registers to be used in the formation of the address and the sum of the contents of the multiple registers is zero.

In one example, when an instruction execution specifies multiple registers to be used in the formation of the address, the designation of a primary register is derived from the expected usage of the instruction. For example, when a z/Architecture® RXY-form instruction execution uses a base register and an index register, it is common for the base register to contain the address of a software array in memory, and for the index register to contain an offset into the array. A zero-valued base register is likely a program error, but a zero-valued index register is used when referencing the first entry of the software array, and is not considered an error. Thus, when a base register and an index register are used, the base register is designated as the primary register, in this example.

Figure 1:
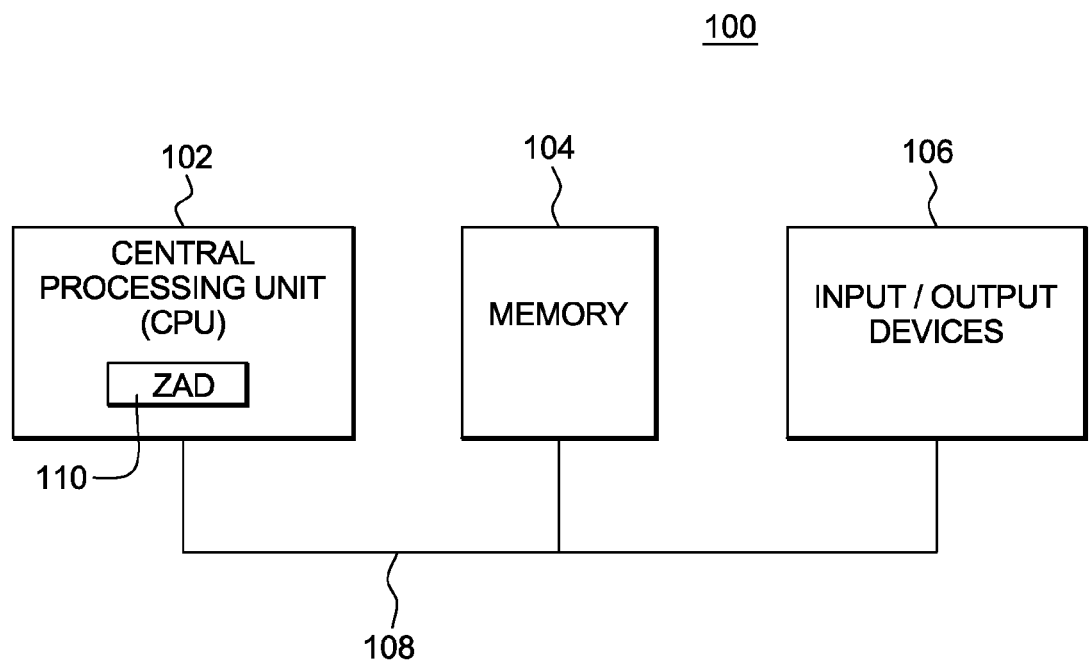
FIG. 1 depicts one example of a computing environment to incorporate and use one or more aspects of the present invention.

One embodiment of a computing environment to incorporate and use one or more aspects of the present invention is described with reference to FIG. 1. In this example, computing environment 100 is based on the z/Architecture® offered by International Business Machines Corporation (IBM®), Armonk, N.Y. Aspects of the z/Architecture® are described in "z/Architecture Principles of Operation," IBM Publication No. SA22-7832-07, 8th Edition, February 2009, which is hereby incorporated herein by reference in its entirety.

Computing environment 100 includes, for instance, a processor 102 (e.g., a central processing unit (CPU)), a memory 104 (e.g., main memory), and one or more input/output (I/O)

devices 106, coupled to one another via, for example, one or more buses 108. As examples, processor 102 is part of a zSeries® server offered by International Business Machines Corporation, Armonk, N.Y. The processor executes an operating system, such as z/OS®, also offered by International Business Machines Corporation. IBM®, zSeries®, z/OS® and z/Architecture® are registered trademarks of International Business Machines Corporation, Armonk, N.Y., U.S.A. Other names used herein may be registered trademarks, trademarks or product names of International Business Machines Corporation or other companies.

Processing within the computing environment is facilitated by the provision of a zero address detection (ZAD) facility 110 that determines when an address usable to access memory has been formed using a zero-valued primary register or has been formed using multiple registers, the sum of the contents of which are zero. The facility enables detection of the use of such registers in address formation without relying on detection of a related or another error. In one example, the facility is a hardware facility of the CPU that includes circuitry to perform the detection. The hardware is enabled, in one example, by the operating system.

Figure 2:
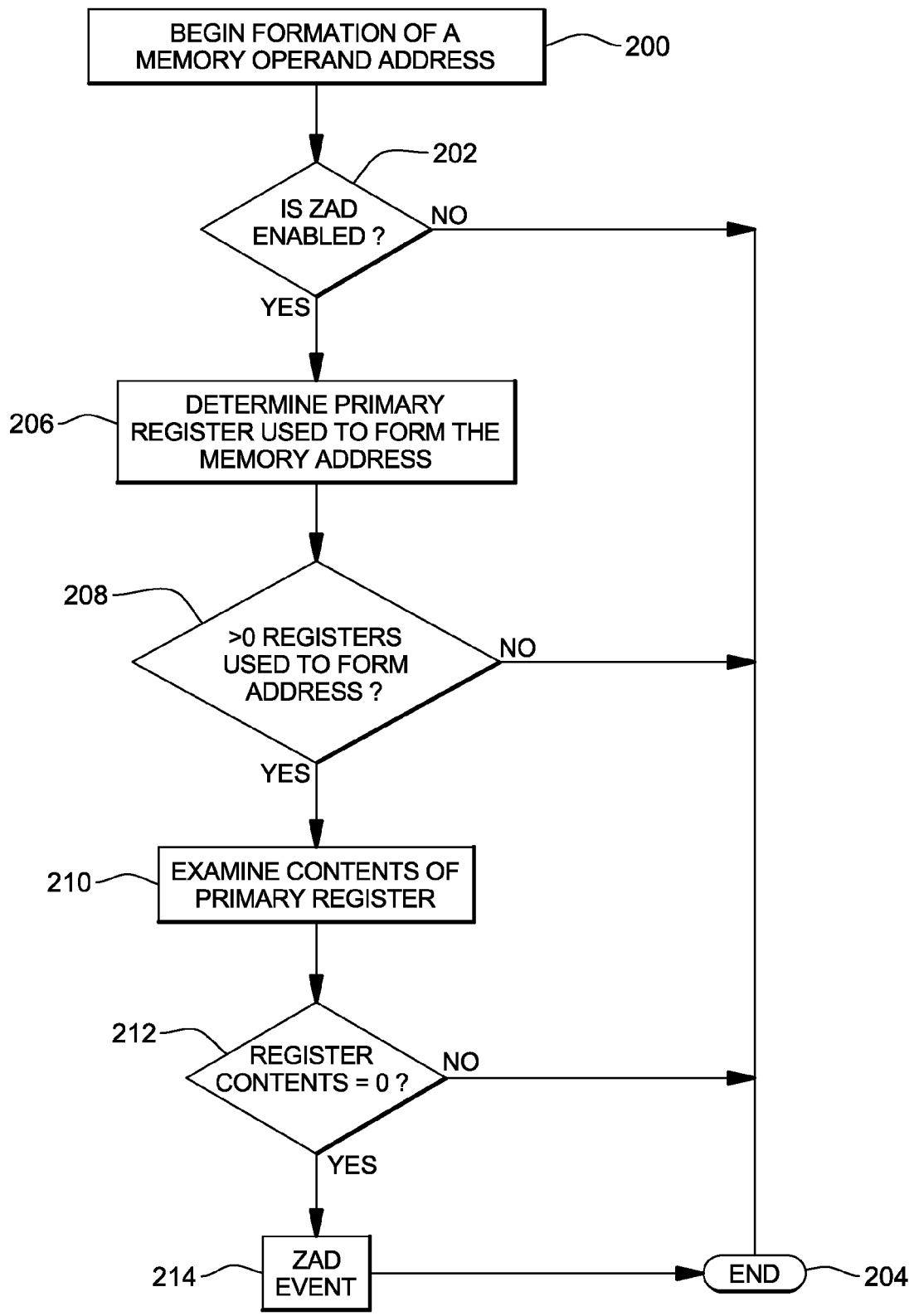
FIG. 2 depicts one embodiment of the logic associated with detecting a zero address event, in accordance with an aspect of the present invention.

One embodiment of the logic associated with detecting zero address events and reporting such events is described with reference to FIG. 2. Referring to FIG. 2, initially, an instruction begins formation of a memory operand address, STEP 200. In particular, the instruction forms an address from the contents of one or more registers and uses that address to access the memory operand. In accordance with an aspect of the invention, in response to accessing the memory operand, hardware within the CPU executing the instruction determines if a zero address event has occurred, as described herein.

A determination is made as to whether zero address detection is enabled in the computing environment, INQUIRY 202. This determination is made by, for instance, checking whether an indicator is set specifying that zero address detection is enabled. If zero address detection is not enabled, then processing is complete, STEP 204. However, if zero address detection is enabled, then processing continues with determining the primary register used to form the memory address, STEP 206. The primary register is determined based on expected usage.

For example, an instruction may specify that the contents of one or more registers are to be used to form a memory operand address. For instructions that specify a single register, that register is referred to as the primary register. For instructions that specify more than one register, the registers are classified, in one example, as a primary register and one or more secondary registers depending on expected usage of the instruction. As an example, in the z/Architecture®, an RXY form instruction can specify up to two general registers for the formation of a memory operand address. These registers are called a base register and an index register. When both registers are specified by the instruction, in one example, the base register, which may include an address of a software array in memory, is considered the primary register, if the base register number is non-zero; and the index register, which may include an offset into the array, is considered the secondary register. Further details regarding the determination of the primary register are described with reference to FIG. 3.

Figure 3:
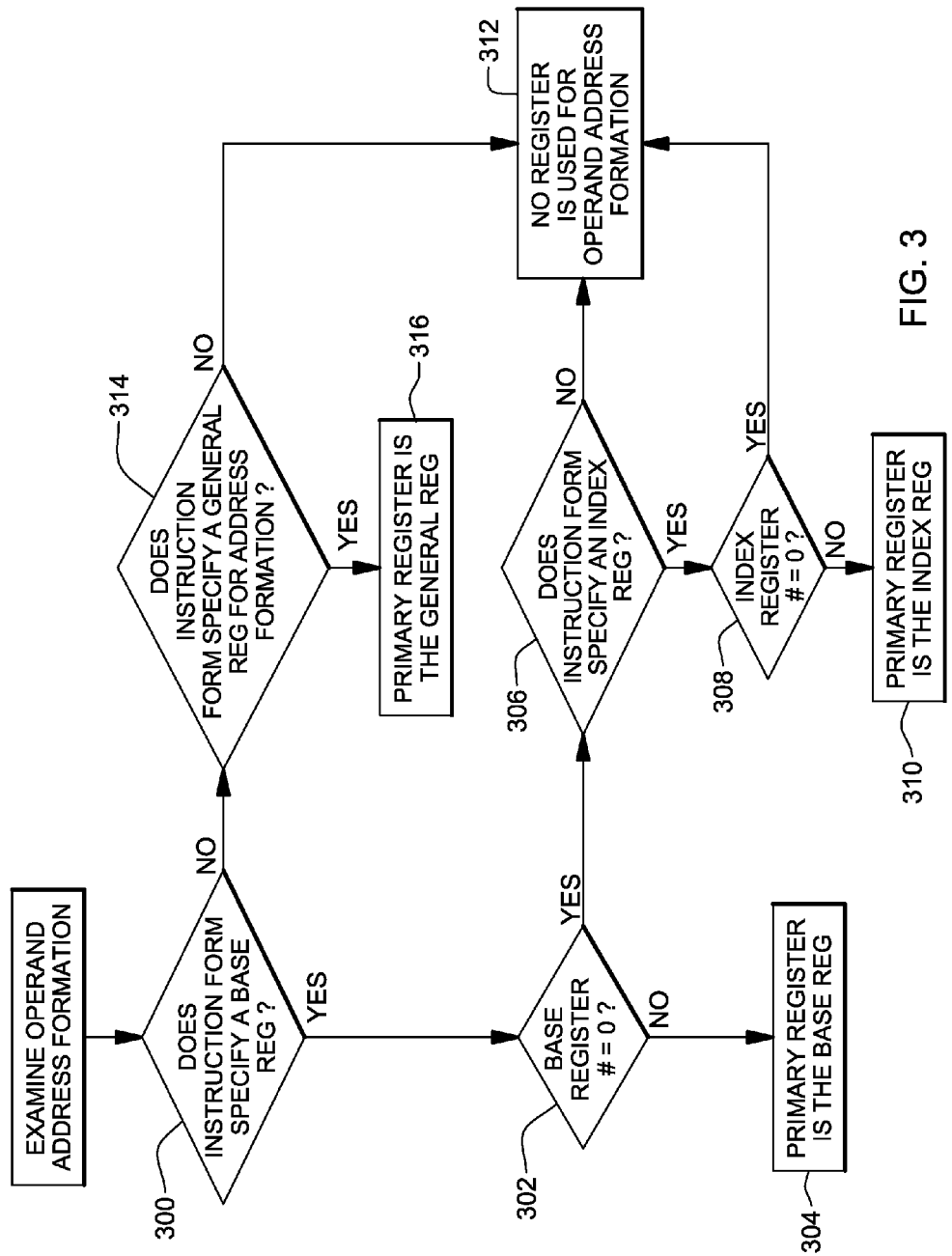
FIG. 3 depicts one example of the logic to determine a primary register, in accordance with an aspect of the present invention.

Referring to FIG. 3, initially, a determination is made as to whether the instruction form specifies a base register, INQUIRY 300. For example, certain instructions, such as the RX, RXE, RXF and RXY instructions of the z/Architecture® may use multiple registers, one of which may be a base register. If the instruction form does specify a base register, then a determination is made as to whether the base register number is zero, INQUIRY 302. If it is not zero, then the base register is considered herein as the primary register, STEP 304.

Returning to INQUIRY 302, if the instruction form specifies a base register, but the base register number is zero, then a further determination is made as to whether the instruction form specifies an index register, INQUIRY 306. If the instruction form does specify an index register, then a determination is made as to whether the index register number is zero, INQUIRY 308. If the index register number is not zero, then the index register is the primary register, STEP 310.

If, however, the index register number is equal to zero, then processing proceeds to STEP 312, in which it is indicated that no register is used for operand address formation. Similarly, if the base register number is equal to zero, INQUIRY 302, and the instruction form does not specify an index register, INQUIRY 306, then no register is used for operand address formation, STEP 312.

Returning to INQUIRY 300, if the instruction form does not specify a base register, then a determination is made as to whether the instruction form specifies a general register for address formation, INQUIRY 314. If not, then no register is used for operand address formation, STEP 312. However, if the instruction form does specify a general register for address formation, then the general register is the primary register, STEP 316.

Returning to FIG. 2, subsequent to determining the primary register, STEP 206, a determination is made as to whether greater than zero registers are used to form the address, INQUIRY 208. If no registers are used to form the address, then processing is complete, STEP 204. Otherwise, the contents of the primary register are examined, STEP 210. If the register contents are not equal to zero, INQUIRY 212, then processing is complete (i.e., no ZAD event), STEP 204. If, however, the contents of the register are equal to zero, then a zero address detection event is recognized, STEP 214.

With this event, as one particular example, an identifier of the address space control element (ASCE ID) to which the alert applies is stored in memory, as well as an access register number, if the ASCE ID indicates access register mode. Additionally, in one example, the zero address detection (ZAD) facility is one event of a Program Event Recording (PER) facility offered by International Business Machines Corporation, and therefore, the ZAD bit in the PER event indicator is set, and a PER interrupt is taken. PER, which is described in further detail below, provides a mechanism for detecting and reporting certain program events useful for debugging programs.

In particular, in accordance with an aspect of the present invention, the zero address detection event is recognized as a PER zero address detection event, when, for instance, a specified bit (e.g., bit 1) of the program status word (PSW) is set and a PER zero address detection mask indicator in a specified control register (e.g., CR9) is set. In response to recognizing the event as a PER event, a corresponding bit is set in the PER code at an assigned storage location (e.g., location 150). The PER ASCE ID (AI), and possibly, the PER access ID (PAID) are filled in with information regarding the operand that caused the event. The program is alerted to the occurrence of a PER event through a program interruption with a specified bit (e.g., bit 8) of the Program Interruption Code set. The occurrence of the event does not affect the execution of the instruction.

One embodiment of detecting and reporting a zero address event is described above. There are many alternatives to this implementation. One alternative or an additional implementation is described with reference to FIG. 4. In this example, the instruction specifies multiple registers (e.g., two registers) to be used in the formation of the memory operand address.

Figure 4:
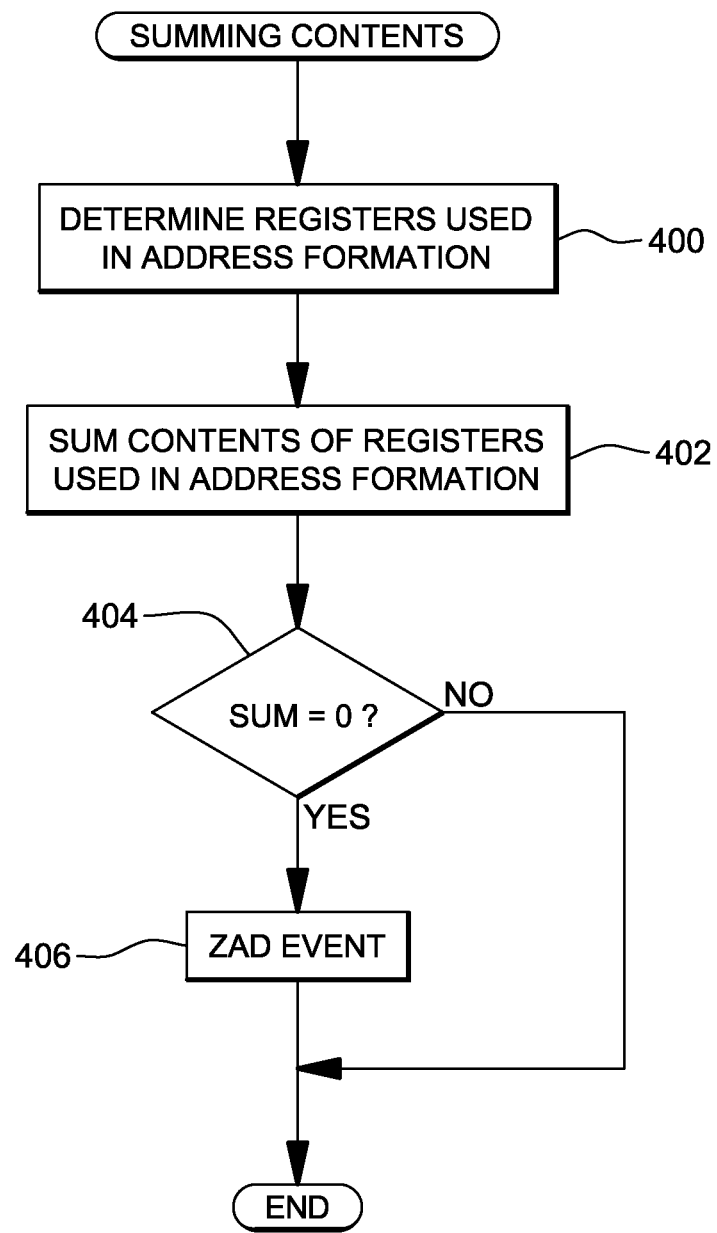
FIG. 4 depicts another embodiment of the logic to detect a zero address event, in accordance with an aspect of the present invention.

Referring to FIG. 4, initially a determination is made as to the registers that were used in address formation, STEP 400. In this example, those registers are specified by the instruction, and include, for instance, a base register and an index register. In another embodiment, however, there may be more than two registers and/or the registers may be other than base and/or index registers.

The contents of the registers used in address formation are then summed to obtain a result, STEP 402. If the result of summing the contents of the two registers is zero (or substantially zero), INQUIRY 404, then a zero address event is recognized, STEP 406. Otherwise, there is no zero address event and processing is complete.

Although various implementations of determining when there is a zero address event and reporting such event are described above, other possibilities also exist. Further, the use of the term "primary register" is not meant to be limiting in any way. Primary register is merely a register selected to be examined, as described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
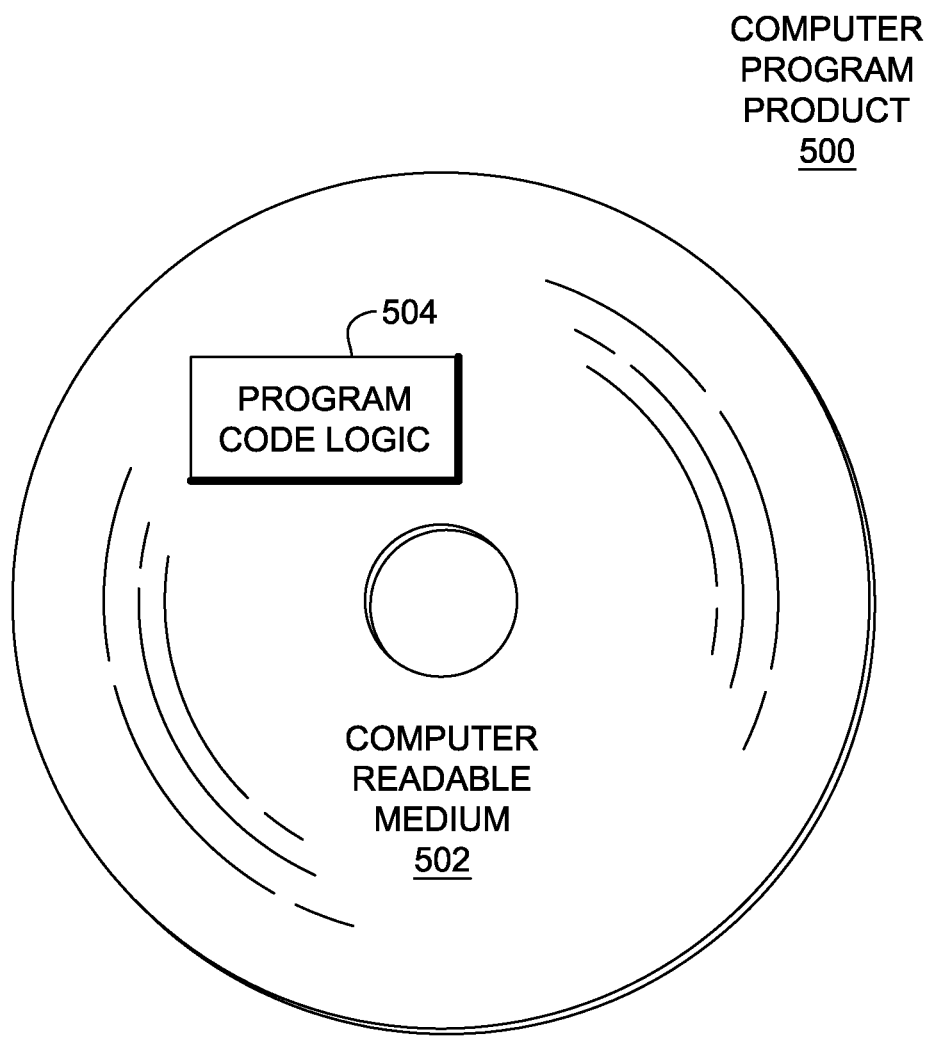
FIG. 5 depicts one embodiment of a computer program product incorporating one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, the information provided in response to a zero address event can be different than described herein. Further, structures other than registers may be used in the formation of addresses and these structures are included in the definition of registers, as used herein.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing of a computing environment, the computer program product comprising:

a non-transitory storage medium readable by a processing circuit and storing instructions for execution by the processing circuit for performing a method comprising:

deciding, by a processor, which one or more registers of at least one register used to form a memory address is to be examined;

examining, by the processor, contents of the one or more registers to be examined;

determining, based on the examining, whether there is a zero address event in the formation of the memory address, wherein a zero address event is an event based on determining at least one register selected for use in forming the memory address has contents consisting of all zeros; and alerting a program executed by the processor of the zero address event, based on the determining indicating the zero address event, wherein the determining detects the zero address event absent detection of a related error or another error.

2. The computer program product of claim 1, wherein the deciding indicates the one or more registers is a general register.

3. The computer program product of claim 1, wherein the deciding comprises:
- determining whether an instruction issued by the program specifies use of a base register to form the memory address; and
- checking whether a number of the base register is zero, based on the instruction specifying a base register, wherein based on the checking indicating a non-zero number of the base register the base register is to be examined.

4. The computer program product of claim 3, wherein the checking indicates a zero for the number of the base register, and wherein the deciding further comprises:
- determining whether the instruction specifies use of an index register to form the memory address; and
- checking whether a number of the index register is zero, based on the instruction specifying an index register, wherein based on the checking indicating a non-zero number of the index register the index register is to be examined.

5. The computer program product of claim 1, wherein the at least one register includes a plurality of registers and the deciding indicates that the one or more registers is the plurality of registers.

6. The computer program product of claim 5, wherein the determining comprises summing contents of the plurality of registers, and wherein the determining determines that there is a zero address event in the formation of the memory address, based on the sum equaling zero.

7. The computer program product of claim 1, wherein the deciding comprises determining which register of the at least one register is a primary register, wherein the primary register is to be examined, and wherein the determining comprises checking whether contents of the primary register are zero, wherein the determining determines there is a zero address event, based on the contents of the primary register being equal to zero.

8. The computer program product of claim 7, wherein determining the primary register comprises:
- determining whether an instruction issued by the program specifies use of a base register to form the memory address;
- checking whether a number of the base register is zero, based on the instruction specifying a base register, wherein based on the checking indicating a non-zero number for the base register, the base register is the primary register;
- determining whether the instruction specifies use of an index register to form the memory address, based on the checking indicating a zero number for the base register;
- checking whether a number of the index register is zero, based on the instruction specifying an index register, wherein based on the checking indicating a non-zero number for the index register, the index register is the primary register; and
- selecting a general register specified in the instruction as the primary register, based on the instruction not specifying a base register.

9. The computer program product of claim 1, wherein the alerting comprises causing a program event recording interrupt to alert the program.

10. The computer program product of claim 9, wherein the alerting comprises:
- storing in memory at least one of an identifier of an address space to which the alert applies and an identifier of an access register used by the instruction; and
- setting an indicator relating to the alert.

11. The computer program product of claim 1, wherein the method further comprises:
- based on execution of an instruction to form the memory address to access a memory operand, determining whether zero address detection is enabled; and
- based on zero address detection being enabled, performing the deciding, examining, determining and alerting.

12. A computer system for facilitating processing of a computing environment, the computer system comprising:
- a memory; and
- a processor in communications with the memory, wherein the computer system is configured to perform a method, said method comprising:
  - deciding, by a processor, which one or more registers of at least one register used to form a memory address is to be examined;
  - examining, by the processor, contents of the one or more registers to be examined;
  - determining, based on the examining, whether there is a zero address event in the formation of the memory address, wherein a zero address event is an event based on determining at least one register selected for use in forming the memory address has contents consisting of all zeros; and
  - alerting a program executed by the processor of the zero address event, based on the determining indicating the zero address event, wherein the determining detects the zero address event absent detection of a related error or another error.

13. The computer system of claim 12, wherein the deciding comprises:
- determining whether an instruction issued by the program specifies use of a base register to form the memory address; and
- checking whether a number of the base register is zero, based on the instruction specifying a base register, wherein based on the checking indicating a non-zero number of the base register the base register is to be examined.

14. The computer system of claim 13, wherein the checking indicates a zero for the number of the base register, and wherein the deciding further comprises:
- determining whether the instruction specifies use of an index register to form the memory address; and
- checking whether a number of the index register is zero, based on the instruction specifying an index register, wherein based on the checking indicating a non-zero number of the index register the index register is to be examined.

15. The computer system of claim 12, wherein the at least one register includes a plurality of registers and the deciding indicates that the one or more registers is the plurality of registers, and wherein the determining comprises summing contents of the plurality of registers, and wherein the determining determines that there is a zero address event in the formation of the memory address, based on the sum equaling zero.

16. The computer system of claim 12, wherein the deciding comprises determining which register of the at least one register is a primary register, wherein the primary register is to be examined, and wherein the determining comprises checking whether contents of the primary register are zero, wherein the determining determines there is a zero address event, based on the contents of the primary register being equal to zero.

17. The computer system of claim 16, wherein determining the primary register comprises:
- determining whether an instruction issued by the program specifies use of a base register to form the memory address;
- checking whether a number of the base register is zero, based on the instruction specifying a base register, wherein based on the checking indicating a non-zero number for the base register, the base register is the primary register;
- determining whether the instruction specifies use of an index register to form the memory address, based on the checking indicating a zero number for the base register;
- checking whether a number of the index register is zero, based on the instruction specifying an index register, wherein based on the checking indicating a non-zero number for the index register, the index register is the primary register; and
- selecting a general register specified in the instruction as the primary register, based on the instruction not specifying a base register.

18. A method for facilitating processing of a computing environment, the method comprising:
- deciding, by a processor, which one or more registers of at least one register used to form a memory address is to be examined;
- examining, by the processor, contents of the one or more registers to be examined;
- determining, based on the examining, whether there is a zero address event in the formation of the memory address, wherein a zero address event is an event based on determining at least one register selected for use in forming the memory address has contents consisting of all zeros; and
- alerting a program executed by the processor of the zero address event, based on the determining indicating the zero address event, wherein the determining detects the zero address event absent detection of a related error or another error.

19. The method of claim 18, wherein the at least one register includes a plurality of registers and the deciding indicates that the one or more registers is the plurality of registers, and wherein the determining comprises summing contents of the plurality of registers, and wherein the determining determines that there is a zero address event in the formation of the memory address, based on the sum equaling zero.

20. The method of claim 18, wherein the deciding comprises determining which register of the at least one register is a primary register, wherein the primary register is to be examined, and wherein the determining comprises checking whether contents of the primary register are zero, wherein the determining determines there is a zero address event, based on the contents of the primary register being equal to zero.

\* \* \* \* \*